(12) United States Patent
Kaliaperumal et al.

(10) Patent No.: US 11,589,404 B2
(45) Date of Patent: *Feb. 21, 2023

(54) LOCATION-AWARE IDENTIFICATION OF NETWORK RESOURCES

(71) Applicant: ARRIS Enterprises LLC, Suwanne, GA (US)

(72) Inventors: Rajesh A Kaliaperumal, Cupertino, CA (US); Paul Petrus, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/877,506

(22) Filed: May 19, 2020

(65) Prior Publication Data

US 2020/0281036 A1 Sep. 3, 2020

Related U.S. Application Data

(63) Continuation of application No. 16/025,650, filed on Jul. 2, 2018, now Pat. No. 10,701,750.

(Continued)

(51) Int. Cl.
*H04W 4/00* (2018.01)
*H04W 76/15* (2018.01)

(Continued)

(52) U.S. Cl.
CPC ........... *H04W 76/15* (2018.02); *H04W 64/00* (2013.01); *H04W 72/048* (2013.01); *G01S 19/13* (2013.01);

(Continued)

(58) Field of Classification Search
CPC ... H04W 76/15; H04W 64/00; H04W 72/048; H04W 72/02; H04W 72/0453;

(Continued)

(56) References Cited

U.S. PATENT DOCUMENTS

2003/0054812 A1   3/2003   Hunzinger
2008/0221951 A1   9/2008   Stanforth et al.

(Continued)

OTHER PUBLICATIONS

"Office Action for corresponding European Application No. 18746367.4, dated Mar. 1, 2021, 6 pages".

(Continued)

*Primary Examiner* — Stephen M D Agosta
(74) *Attorney, Agent, or Firm* — Stewart M. Wiener; Steven Stupp (57) ABSTRACT

An electronic device that establishes a second connection is described. After determining its location, the electronic device may provide information that specifies the location to a cellular-telephone network using a first connection to the cellular-telephone network. In response, the electronic device may receive mapping information. When the mapping information indicates that there are available channels in associated bands of frequencies at the location, the electronic device may: perform a scan of the available channels in the associated bands of frequencies; and establish the second connection with a radio node based on scan results. Alternatively, when the mapping information indicates that there are no available channels in associated frequency bands at the location, the electronic device may establish a third connection with the radio node in a licensed band of frequencies.

20 Claims, 5 Drawing Sheets

Related U.S. Application Data (60) Provisional application No. 62/528,070, filed on Jul. 1, 2017.

(51) Int. Cl.

| | | |
|---|---|---|
| *H04W 64/00* | (2009.01) | |
| *H04W 72/04* | (2023.01) | |
| H04W 72/0453 | (2023.01) | |
| G01S 19/13 | (2010.01) | |
| H04W 84/12 | (2009.01) | |
| H04W 84/04 | (2009.01) | |
| H04W 88/06 | (2009.01) | |
| H04W 72/02 | (2009.01) | |
| G01S 19/42 | (2010.01) | |

(52) U.S. Cl.
CPC .............. *G01S 19/42* (2013.01); *H04W 72/02* (2013.01); *H04W 72/0453* (2013.01); *H04W 84/042* (2013.01); *H04W 84/12* (2013.01); *H04W 88/06* (2013.01)

(58) Field of Classification Search
CPC ... H04W 84/042; H04W 84/12; H04W 88/06; G01S 19/13; G01S 19/42; H01Q 1/2266; H01Q 1/243; H01Q 13/10; H01Q 13/18; H04L 45/245; H04L 43/06; H04L 43/065; H04L 43/08; H04M 1/724; H04M 1/72403; H04J 14/00; H04J 11/0023; H04J 11/0056; H04J 11/0066; H04J 11/0073

See application file for complete search history.

(56) References Cited

U.S. PATENT DOCUMENTS

| | | | | |
|---|---|---|---|---|
| 2009/0207798 A1* | 8/2009 | Shan | ..................... | H04L 5/0064 370/329 |
| 2009/0247141 A1 | 10/2009 | Vale | | |
| 2009/0310803 A1* | 12/2009 | Zhang | ................... | H04W 72/02 381/311 |
| 2010/0124930 A1 | 5/2010 | Andrews et al. | | |
| 2010/0173586 A1* | 7/2010 | McHenry | ............ | H04L 27/0006 455/62 |
| 2011/0034194 A1* | 2/2011 | Han | .................. | H04W 74/0808 455/509 |
| 2012/0134328 A1 | 5/2012 | Gauvreau et al. | | |
| 2013/0142132 A1* | 6/2013 | Kim | .................. | H04W 72/0473 370/329 |
| 2013/0188564 A1 | 7/2013 | Yu et al. | | |
| 2013/0223357 A1 | 8/2013 | Jones et al. | | |
| 2014/0011509 A1* | 1/2014 | Markwart | ............. | H04W 16/14 455/452.1 |
| 2014/0192725 A1 | 7/2014 | Black et al. | | |
| 2014/0242981 A1 | 8/2014 | Hassan et al. | | |
| 2014/0269526 A1* | 9/2014 | Mitola, III | ............ | H04L 5/0037 370/329 |
| 2014/0308954 A1* | 10/2014 | Wang | ................... | H04W 36/165 455/436 |
| 2014/0321425 A1* | 10/2014 | Mueck | ............. | H04W 36/0009 370/331 |
| 2015/0092758 A1* | 4/2015 | Chen | ..................... | H04W 16/14 370/336 |
| 2015/0181601 A1* | 6/2015 | Schmidt | ................. | H04L 5/001 370/329 |
| 2016/0050690 A1* | 2/2016 | Yun | ................... | H04W 72/1226 370/329 |
| 2016/0212624 A1* | 7/2016 | Mueck | .................. | H04W 72/10 |
| 2017/0147940 A1* | 5/2017 | Mitola, III | ............. | G06N 7/005 |
| 2018/0115905 A1* | 4/2018 | Sirotkin | ................ | H04W 16/14 |
| 2020/0008138 A1* | 1/2020 | Sasindran | ............ | H04W 76/10 |

OTHER PUBLICATIONS

PCT International Search Report & Written Opinion, Re: Application No. PCT/US2017/024195, dated Jun. 6, 2017.

PCT International Search Report & Written Opinion, Re: Application No. PCT/US2018/040657, dated Oct. 9, 2018.

* cited by examiner

LOCATION-AWARE IDENTIFICATION OF NETWORK RESOURCES

CROSS REFERENCE TO RELATED APPLICATIONS

This application claims priority under 35 U.S.C. 120 as a Continuation of U.S. patent application Ser. No. 16/025,650, entitled "Location-Aware Identification of Network Resources," by Rajesh Kaliaperumal and Paul Petrus, filed Jul. 2, 2018, which claims priority to U.S. Provisional Patent Application No. 62/528,070, "Location-Aware Identification of Network Resources," by Rajesh Kaliaperumal and Paul Petrus, filed on Jul. 1, 2017, the contents of each of which are herein incorporated by reference.

BACKGROUND

Field

The described embodiments relate to techniques for communicating information among electronic devices. In particular, the described embodiments relate to techniques for performing network selection at a location based on information that specifies available channels in associated bands of frequencies.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

Typically, network selection or cell selection (either intra-frequency, inter-frequency or inter-radio access technology) by an electronic device is governed by a policy of the electronic device (which is sometimes referred to as a 'mobility policy'). In the case of communication in a cellular network, an electronic device is usually pre-provisioned with the associated mobility policy.

However, for radio access networks such as Citizen Broadband Radio Service (CBRS), where the spectrum allocation is dynamic, it can be difficult to pre-provision an electronic device with a mobility policy. Consequently, the first time an electronic device is attempting to select a channel in a dynamic network such as CBRS, it often needs to scan the entire spectrum. Then, the electronic device can 'remember' the channel and the location (such as based on the latitude, the longitude, an identifier of a macrocell tower, etc.). This stored information can help optimize a subsequent network-selection process, at the cost of memory space. Moreover, there are limits to the effectiveness of this approach, because the available spectrum at a location may be changed (such as by a spectrum allocation server). Therefore, there is a risk that the stored information in the electronic device may not be valid.

SUMMARY

The described embodiments relate to an electronic device that establishes a second connection. This electronic device includes an interface circuit that communicates with a radio node and a cellular-telephone network. During operation, the electronic device determines a location of the electronic device. Then, the electronic device provides information that specifies the location for the cellular-telephone network, where the information is associated with a first connection to the cellular-telephone network. Moreover, the electronic device receives mapping information. When the mapping information indicates that there are available channels in associated bands of frequencies at the location, the electronic device: performs a scan of the available channels in the associated bands of frequencies; and establishes the second connection with the radio node based on scan results.

Note that the location may be determined based on received location information that is associated with: a Global Positioning System, the cellular-telephone network, and/or a wireless local area network.

Moreover, the second connection may be compatible with a Long Term Evolution (LTE) communication protocol.

Furthermore, the first connection may be compatible with: a cellular-telephone communication protocol, and/or an IEEE 802.11 communication protocol.

Additionally, the radio node may include an eNode-B.

In some embodiments, the second connection is in a shared-license-access band of frequencies that is shared by the radio node with another user that has higher priority than the radio node.

Moreover, when the mapping information indicates that there are no available channels in associated frequency bands at the location, the electronic device may establish a third connection with the radio node in a licensed band of frequencies.

Furthermore, the information may be for an administrator computer of the radio node that is external to mobile-network-operator infrastructure of the cellular-telephone network. Alternatively, the information may be for a spectrum allocation server.

Another embodiment provides a computer-readable storage medium with a program module for use with the electronic device. When executed by the electronic device, this program module causes the electronic device to perform at least some of the aforementioned operations.

Another embodiment provides a method, which may be performed by the electronic device. This method includes at least some of the aforementioned operations.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device that establishes a second connection is described. After determining its location, the electronic device may provide information that specifies the location to a cellular-telephone network using a first connection to the cellular-telephone network. In response, the electronic device may receive mapping information. When the mapping information indicates that there are available channels in associated bands of frequencies at the location, the electronic device may: perform a scan of the available channels in the associated bands of frequencies; and establish the second connection with a radio node based on scan results. Alternatively, when the mapping information indicates that there are no available channels in associated frequency bands at the location, the electronic device may establish a third connection with the radio node in a licensed band of frequencies.

By facilitating efficient network selection, the communication technique may facilitate faster and more reliable communication. In particular, the communication technique may eliminate the requirement that the electronic device be pre-provisioned with a mobility protocol. Moreover, the electronic device may not need to store information that specifies one or more channels that were previously available at the location. In addition to sparing memory resources, this approach may ensure that the network selection is based on accurate information (i.e., the mapping information). This may allow the electronic device to use a dynamic network, such as a shared-license-access band of frequencies. This capability may allow the shared-license-access band of frequencies to be used by a larger set of users than a higher-priority user. Consequently, the communication technique may facilitate dynamic and efficient identification of available shared network resources, and may facilitate improved communication performance during communication, e.g., in the shared-license-access band of frequencies. In turn, the improved communication performance may improve the user experience when communicating with a radio node via the shared-license-access band of frequencies, and thus may improve customer satisfaction and retention.

In the discussion that follows, the electronic device communicates packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, a cellular-telephone communication protocol, Wi-Fi and/or Long Term Evolution (LTE) are used as illustrative examples. However, a wide variety of communication protocols may be used.

Moreover, the communication technique may be applied to one or more channels in one or more bands of frequencies. In the discussion that follows, one or more channels in a shared-license-access band of frequencies are used as an illustrative example. However, a wide variety of bands of frequencies may be used, including: a band of frequencies near or including 2.4 GHz, a band of frequencies near or including 3.6 GHz, a band of frequencies near or including 4.9 GHz, a band of frequencies near or including 5 GHz, a band of frequencies near or including 5.9 GHz and/or another band of frequencies.

A cellular-telephone network may include base stations (and associated cell towers) that implement so-called 'macro cells.' These macro cells may facilitate communication with hundreds of users (such as hundreds of cellular telephones) over distances of kilometers. In general, the positioning of the cell towers (and the antennas) is carefully designed and optimized by a network operator to maximize the performance of the cellular-telephone network (such as the throughput, the capacity, the block error rate, etc.) and to reduce cross-talk or interference between the signals transmitted by different cell towers and/or different macro cells.

However, there are often gaps in the coverage offered by macro cells. In particular, gaps in radio coverage can occur in the interior of a building because the transmission in a macro cell may not be powerful enough to penetrate the building. Consequently, some users operate local transceivers that provide short-range communication in the cellular-telephone network. These so-called femto cells' provide short-range communication (e.g., up to 10 m) for a few individuals.

In addition, larger entities or organizations (such as those with 50-60 users) may operate local transceivers that provide communication in the cellular-telephone network over a range of 100 m. In principle, such a small-scale network complements the service offered by the network operator and can offer improved communication performance, such as in a particular venue or environment. This intermediate-range coverage in the cellular-telephone network is typically referred to as a 'small cell.'

Recently, entities have established or hosted small cells based on a data communication protocol, such as LTE. (However, as noted previously, a wide variety of communication techniques or protocols may be used to implement a small cell, such as those used in cellular systems or to communicate with a radio-access network and are not limited to LTE. For example, in some embodiments the described communication technique is used in conjunction with Wi-Fi.) These small cells are examples of enterprise-hosted networks or EHNs (which are sometimes referred to as 'neutral-host networks), i.e., networks that are hosted by entities other than a network operator (such as a cellular-telephone carrier).

In principle, a small cell that implements an LTE network can allow an entity (such as a company or an enterprise) to provide a wide variety of services. However, one challenge is how to obtain sufficient resources (such as sufficient bandwidth in a shared communication channel) to provide high-quality communication performance, especially when there is concurrent communication with multiple electronic devices.

In order to address this constraint, additional bands of frequencies are being considered for use by macro cells and small-scale networks. For example, one proposal involves the use of a shared-license-access band of frequencies near 3.5 GHz in the U.S. This shared-license-access band of frequencies may have three tiers of access, including incumbent users, Priority Access Licensees (PALS) and General Authorized Access (GAA) operators. In particular, it has been proposed that 150 MHz of bandwidth between 3.55

GHz and 3.7 GHz be used by GAA operators (such as operators of small-cell networks) for general-purpose communication.

However, this band of frequencies falls within a band of frequencies between 3.4 and 3.8 GHz that is infrequently used by higher-priority users (who are sometimes referred to as 'incumbents'), such as by the U.S. Government (and, in particular, the U.S. Navy) and/or for fixed satellite services. For example, when transmissions by a higher-priority user occur, they can occupy or occur over 8-9 MHz, which corresponds to one or two adjacent or contiguous channels. If transmissions associated with a higher-priority user occur in a particular channel in the shared-license-access band of frequencies, then other users are required to discontinue using this channel to reduce or eliminate interference.

This requirement may disrupt communication in small-scale networks. In particular, the requirement to discontinue use of channels when transmissions by the higher-priority users are present may degrade the communication performance (such as lost connections or reduce data rates), which can adversely impact the user experience when communicating via small-scale networks.

In addition, at least some of the channels in the shared-license-access band of frequencies in different regions (such as in a census track with at least 5000 people) are often auctioned off to network operators as PALs. In particular, a band of frequencies between 3.55 and 3.6 MHz may be available to PALs. Consequently, the channels in the shared-license-access band of frequencies that are available in a particular venue or environment (such as a building) can vary with time.

Because of this dynamic variation, an electronic device that wants to access a channel in the shared-license-access band of frequencies typically needs to perform a full scan of the shared-license-access band of frequencies to identify available channels. This scan is time-consuming and increases power consumption of the electronic device, which can be frustrating for a user and can degrade the user experience.

In order to address these challenges, the communication technique is used to provide mapping information based on a location of an electronic device. This mapping information may indicate current available channels in associated bands of frequencies at the location, which may simplify the scan performed by the electronic device. Note that the bands of frequencies may include one or more bands of frequencies.

Figure 1:
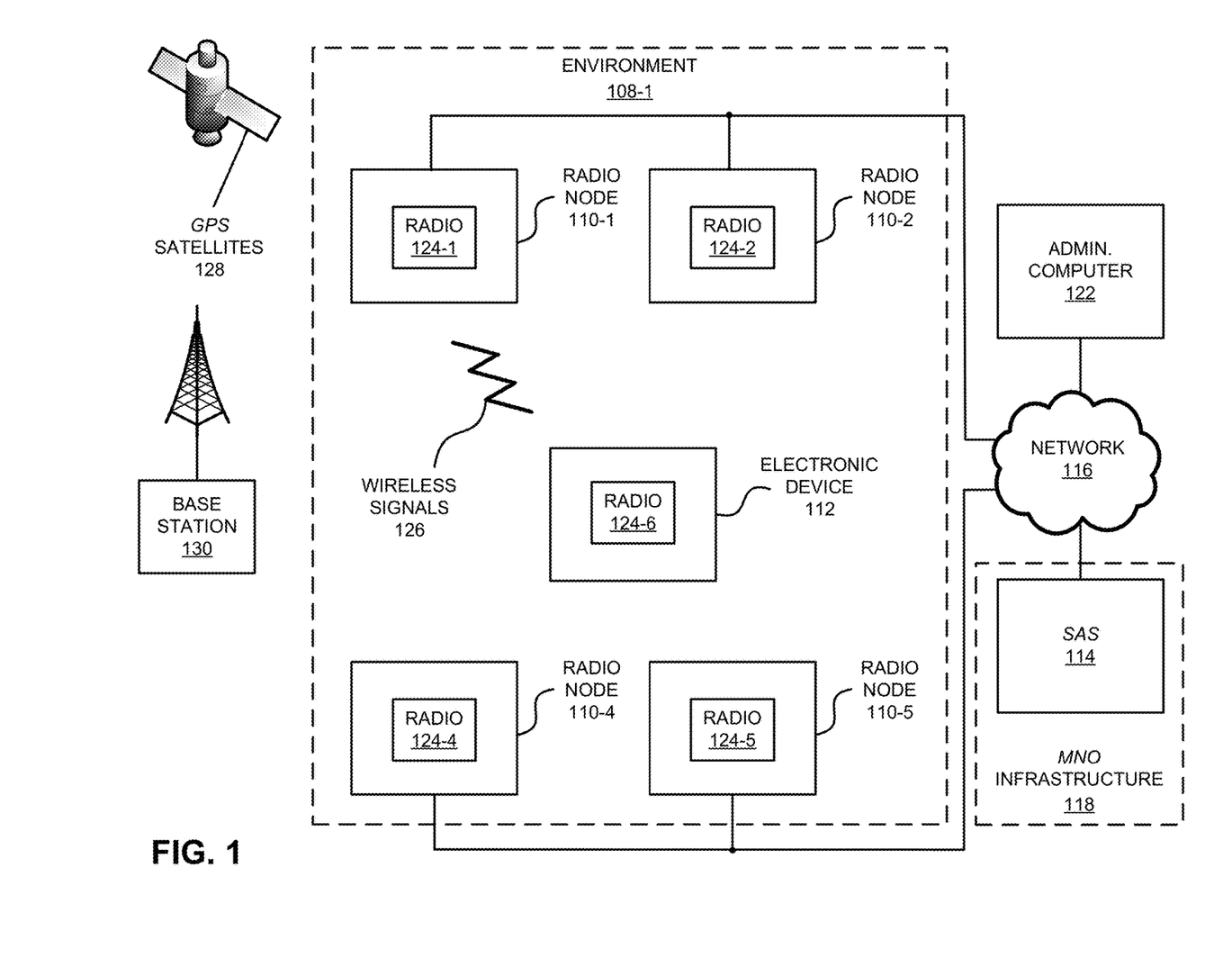
FIG. 1 is a block diagram illustrating electronic devices wirelessly communicating in accordance with an embodiment of the present disclosure.

FIG. 1 presents a block diagram illustrating radio nodes 110 (such as a transceiver or an electronic device that is associated with a small cell that communicates using Wi-Fi or LTE, e.g., it may be or may provide at least some of the functionality of an eNode-B, in a small-cell LTE network associated with or provided by an entity) and electronic device 112 (such as a portable electronic device, e.g., a cellular telephone or a smartphone) wirelessly communicating in an environment 108-1 (such as in or at a venue or a building associated with the entity) according to some embodiments. In particular, radio nodes 110 and electronic device 112 may wirelessly communicate while: transmitting advertising frames on wireless channels, detecting one another by scanning wireless channels, establishing connections (for example, by transmitting association or attach requests), and/or transmitting and receiving packets (which may include the association requests and/or additional information as payloads).

In addition, radio nodes 110 may communicate, via network 116, with spectrum allocation service (SAS) 114 (such as an electronic device that implements a spectrum allocation service) in mobile-network-operator (MNO) infrastructure 118 of a cellular-telephone network (such as the Evolved Packet Core or EPC). In particular, network 116 may include the Internet (and, more generally, a wired network), and radio nodes 110 may access network 116 via a local area network. Alternatively, radio nodes 110 may communicate, via network 116, with administrator computer 122 of radio nodes 110 that is external to mobile-network-operator infrastructure 118 of the cellular-telephone network. For example, administrator computer 122 may be a cloud-based computer that is a controller for radio nodes 110. Thus, in general, communication between radio nodes 110 and spectrum allocation service 114 or administrator computer 122 may involve a wired communication protocol, such as Ethernet.

Figure 5:
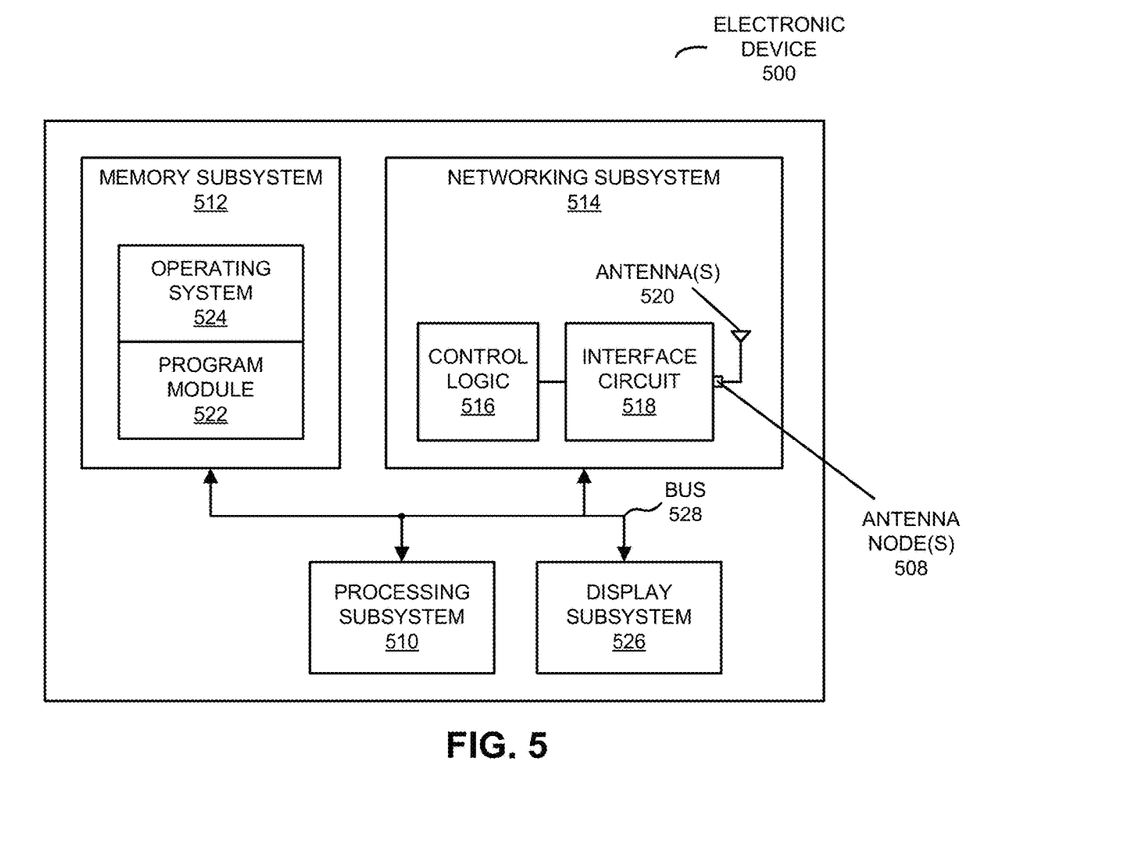
FIG. 5 is a block diagram illustrating an electronic device in accordance with an embodiment of the present disclosure.

As described further below with reference to FIG. 5, radio nodes 110, electronic device 112, spectrum allocation service 114 and/or administrator computer 122 may include subsystems, such as a networking subsystem, a memory subsystem and a processor subsystem. In addition, radio nodes 110 and electronic device 112 may include radios 124 in the networking subsystems. More generally, radio nodes 110 and electronic device 112 can include (or can be included within) any electronic devices with the networking subsystems that enable radio nodes 110 and electronic device 112 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 124 are shown in radio nodes 110 and electronic device 112, one or more of these instances may be different from the other instances of radios 124.

As can be seen in FIG. 1, wireless signals 126 (represented by a jagged line) are transmitted from radio 124-6 in electronic device 112. These wireless signals may be received by radio 124-1 in radio node 110-1. In particular, electronic device 112 may transmit packets. In turn, these packets may be received by radio node 110-1. Moreover, radio node 110-1 may allow electronic device 112 to communicate with other electronic devices, computers and/or servers (either locally or remotely) via network 116, such as cellular-telephone network 120 and/or the small-cell LTE network.

Note that the communication between radio nodes 110 and electronic device 112 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Figure 2:
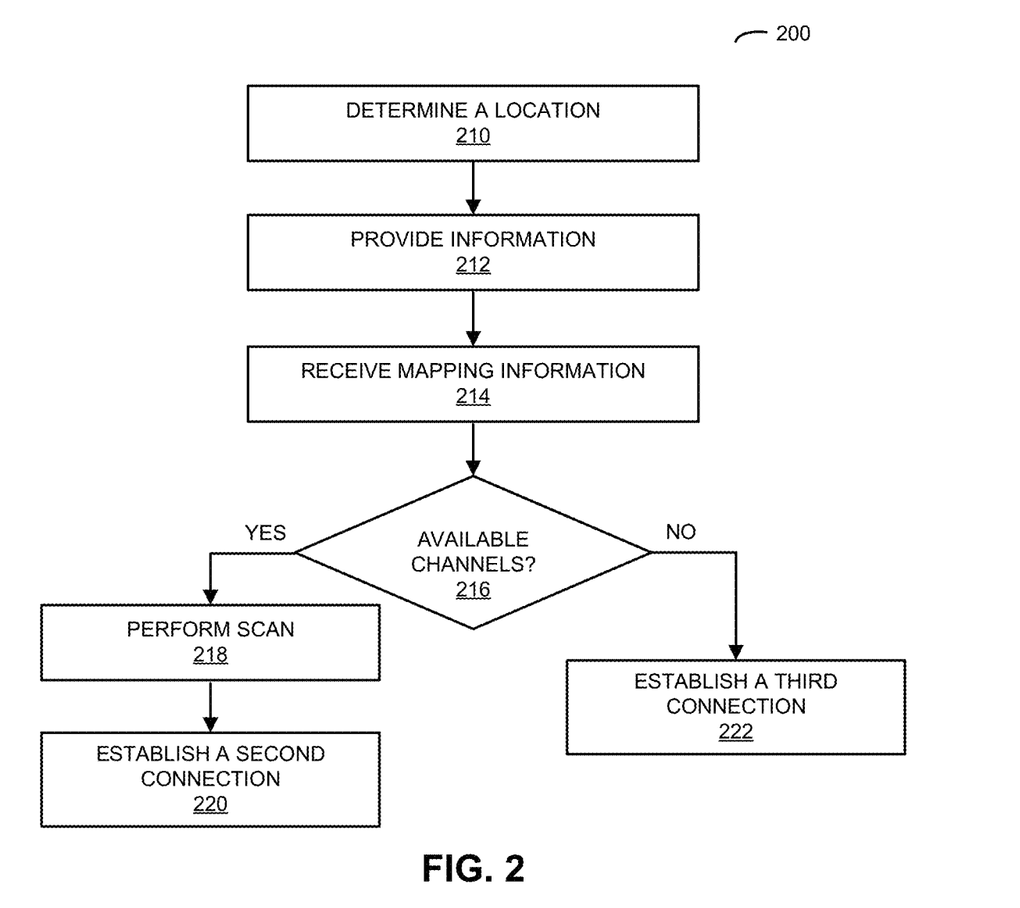
FIG. 2 is a flow diagram illustrating a method for establishing a second connection in accordance with an embodiment of the present disclosure.

As discussed further below with reference to FIGS. 2-4, in the communication technique electronic device 112 determines its location. For example, a processor in electronic device 112 may execute an application in an environment of the electronic device (such as the operation system), and this application may determine the location. Alternatively, in some embodiments radio 124-6 determines the location (e.g., in hardware). Note that the location may be determined based on received location information that is associated with: a Global Positioning System, cellular-telephone network 120, and/or a wireless local area network. For example, electronic device 112 may determine its location based on satellite signals from global position system (GPS) satellites 128. Alternatively, electronic device 112 may determine its location based on wireless signals received from a base station 130 in the cellular-telephone network (which, while not shown, may be coupled to mobile-network-operator infrastructure).

Then, electronic device 112 provides, via network 116, information that specifies the location to cellular-telephone network 120, where the information is associated with a first connection to cellular-telephone network 120. For example, electronic device 112 may use an existing connection that is compatible with: a cellular-telephone communication protocol (such as LTE) and/or Wi-Fi. Moreover, the information specifying the location may be provided to spectrum allocation service 114 or administrator computer 122.

In response, spectrum allocation service 114 or administrator computer 122 may provide, via network 116, mapping information to electronic device 112. In particular, the mapping information may be based on the location and may specify any available channels in associated based of frequencies at or proximate to the location. For example, spectrum allocation service 114 or administrator computer 122 may access, based on the location, predefined mapping information that was previously reported to spectrum allocation service 114 or administrator computer 122 by radio nodes 110 (such as whenever there are changes to the available channels in the associated bands of frequencies).

When the mapping information indicates that there are available channels in associated bands of frequencies at the location, electronic device 112 may: performs a scan of the available channels in the associated bands of frequencies (e.g., the scan may be restricted to the available channels specified by the mapping information); and establishes a second connection with one of radio nodes 110 (such as radio node 110-1) based on scan results. For example, the scan may include available channels in one or more bands of frequencies, including licensed, unlicensed and/or shared-license-access band of frequencies. This second connection may be compatible with LTE. In some embodiments, the second connection is in a shared-license-access band of frequencies that is shared by radio node 110-1 with another user that has higher priority than radio node 110-1.

However, when the mapping information indicates that there are no available channels in associated frequency bands at the location, electronic device 112 may establish a third connection with one of the radio nodes 110 or base station 130 in a licensed band of frequencies (as opposed to the shared-license-access band of frequencies). Therefore, the communication technique may be used in conjunction with a shared and/or an exclusive spectrum.

Thus, the communication technique may facilitate dynamically and efficient identification of available network resources. In particular, the communication technique may simplify and reduce the time associated with the scan and establishing the second connection (and, thus, the handover from the first connection to the second connection). For example, the communication technique may eliminate the need for the electronic device to perform a systematic scan over all possible channels. In addition, the communication technique may eliminate the need to pre-provision electronic device 112 with information about available channels and associated bands of frequencies at different locations, which can quickly become stale or inaccurate (especially in the case of the shared-license-access band of frequencies). Consequently, the communication technique may reduce the time needed to establish the second or the third connection and may improve the communication performance, which may improve the user experience when using electronic device 112 to communicate with radio nodes 110.

In the described embodiments processing a packet or frame in radio nodes 110 and/or electronic device 112 includes: receiving wireless signals 126 with the packet or frame; decoding/extracting the packet or frame from received wireless signals 126 to acquire the packet or frame; and processing the packet or frame to determine information contained in the packet or frame (such as information for the small-cell LTE network).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of the method. FIG. 2 is a flow diagram illustrating an example of a method 200 for establishing a second connection, which may be performed by an electronic device, such as electronic device 112 in FIG. 1. During operation, the electronic device may determine a location (operation 210) of the electronic device. Note that the location may be determined based on received location information that is associated with: a Global Positioning System, the cellular-telephone network, and/or a wireless local area network.

Then, the electronic device may provide information (operation 212) that specifies the location, e.g., to the cellular-telephone network, where the information is associated with a first connection to the cellular-telephone network. The first connection may be compatible with: a cellular-telephone communication protocol (such as LTE) and/or an IEEE 802.11 communication protocol (such as Wi-Fi). In some embodiments, the first connection includes a data connection. Note that the information may be for or provided to an administrator computer of the radio node that is external to mobile-network-operator infrastructure of the cellular-telephone network. Alternatively, the information may be for a spectrum allocation server that is included in the mobile-network-operator infrastructure.

Moreover, the electronic device receives mapping information (operation 214). When the mapping information indicates that there are available channels in associated bands of frequencies at the location (operation 216), the electronic device: performs a scan (operation 218) of the available channels in the associated bands of frequencies; and establishes the second connection (operation 220) with a radio node based on scan results. For example, the second connection may be compatible with LTE. Note that the radio node may include an eNode-B. In some embodiments, the second connection is in a shared-license-access band of frequencies that is shared by the radio node with another user that has higher priority than the radio node.

Alternatively, when the mapping information indicates that there are no available channels in associated frequency bands at the location (operation 216), the electronic device may establish a third connection (operation 222) with, e.g., the radio node in a licensed band of frequencies.

In some embodiments of method 200, there may be additional or fewer operations. Furthermore, the order of the operations may be changed, and/or two or more operations may be combined into a single operation.

Figure 3:
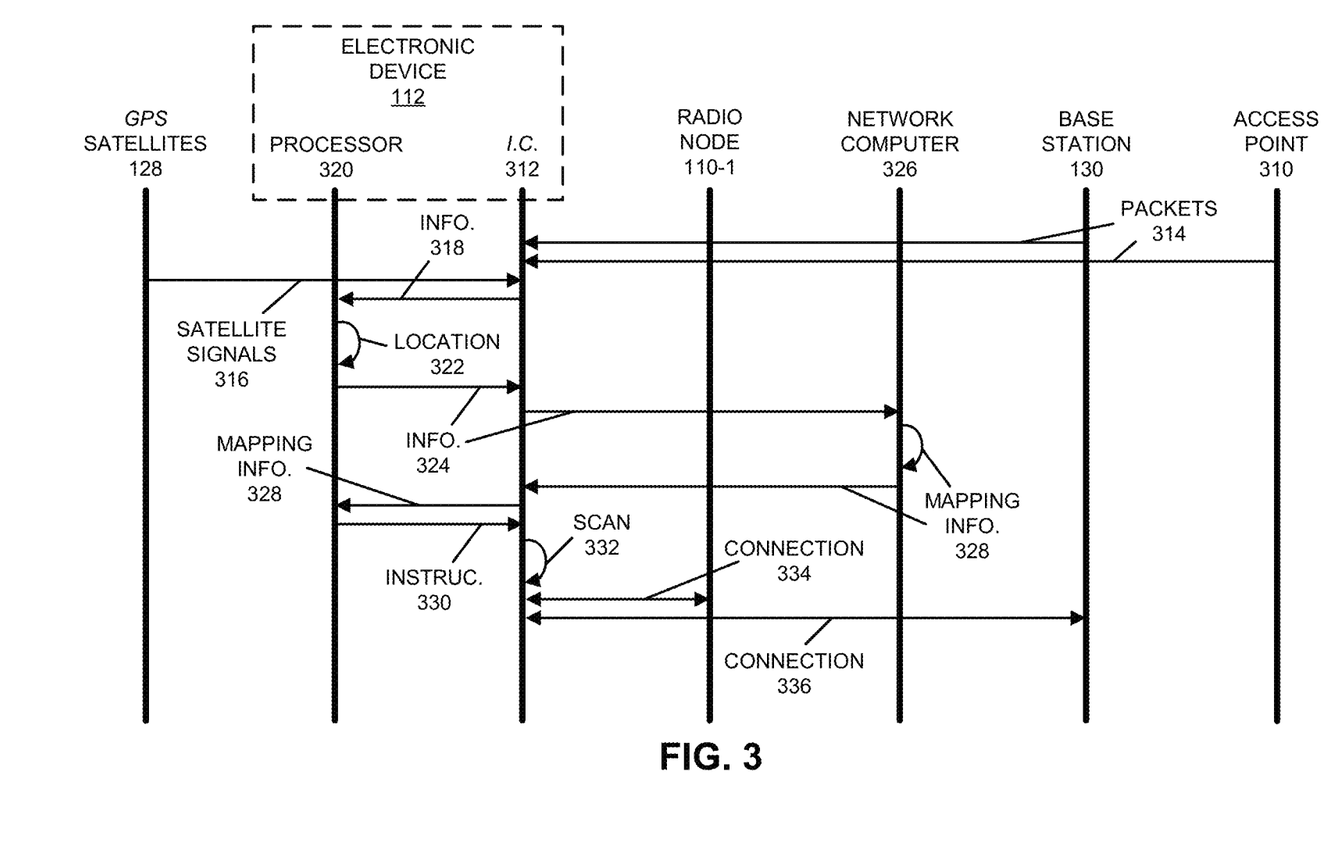
FIG. 3 is a drawing illustrating communication among the electronic devices in FIG. 1 in accordance with an embodiment of the present disclosure.
Figure 4:
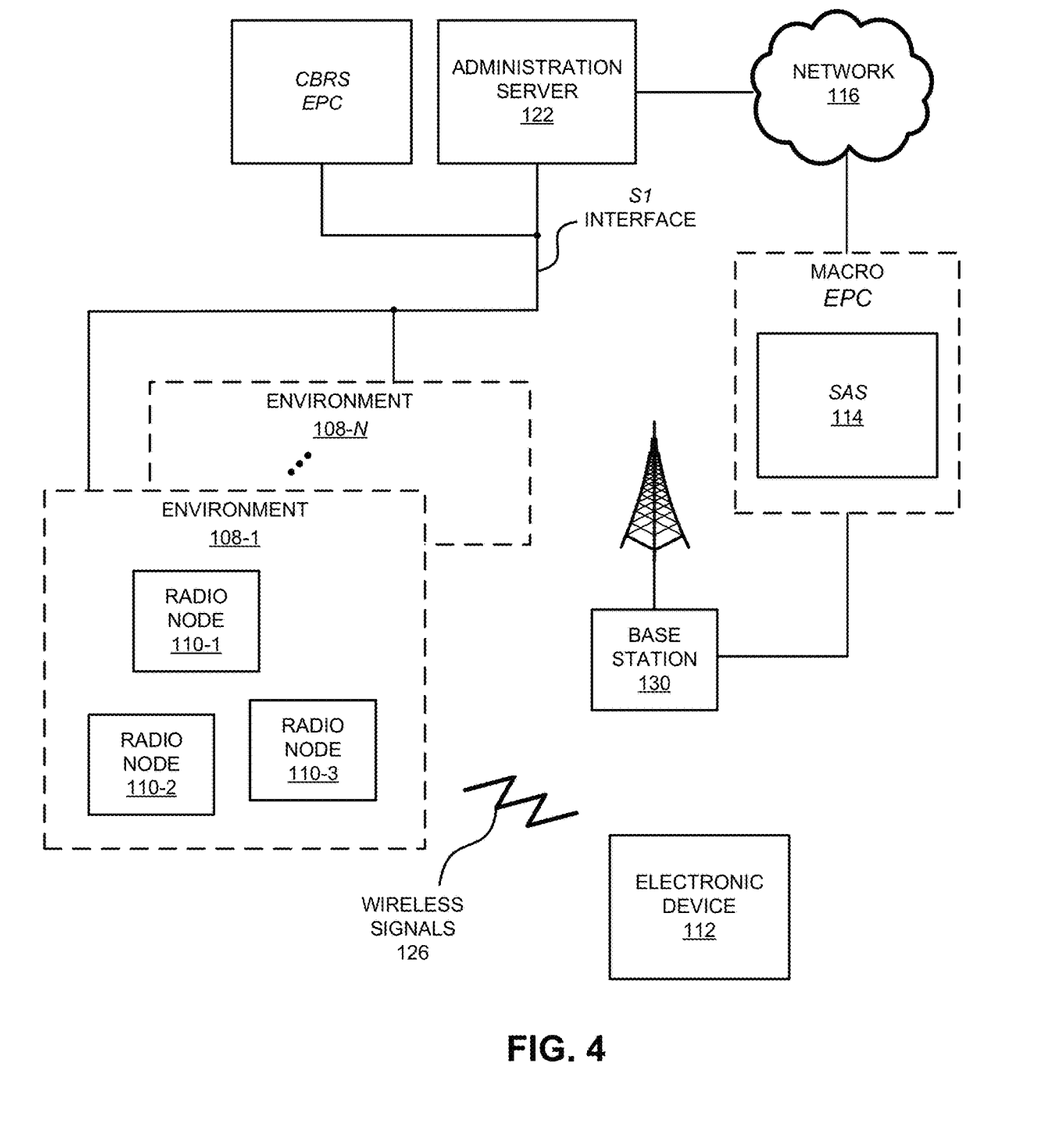
FIG. 4 is a block diagram illustrating electronic devices wirelessly communicating in accordance with an embodiment of the present disclosure.

Embodiments of the communication technique are further illustrated in FIG. 3, which presents a drawing illustrating communication among radio node 110-1, electronic device 112, network computer 326 (such as spectrum allocation service 114 or administrator computer 122), GPS satellites 128, base station 130 and/or optional access point 310 according to some embodiments. In particular, interface circuit (I.C.) 312 may receive packets 314 from base station 130 using a cellular-telephone communication protocol and/or access point 310 using an IEEE 802.11 communication protocol (such as Wi-Fi). Alternatively or additionally, interface circuit 312 may receive satellite signals 316 from GPS satellites 128.

Then, interface circuit 312 may provide information 318 associated with packets 314 and/or satellite signals 316 to processor 320, which executes an application. This application may determine location 322 of electronic device 112. Next, the application executed by processor 320 may provide information 324 that specifies location 322 to interface circuit 312, which provides information 324. For example, information 324 may be provided via a first connection that uses a cellular-telephone communication protocol (such as LTE) and/or an IEEE 802.11 communication protocol to network computer 326. More generally, information 324 may be provided via an existing data connection. In response, network computer 326 determines and then provides mapping information 328 to interface circuit 312, which provides mapping information 328 to processor 320.

When mapping information 328 indicates that there are available channels in associated bands of frequencies at location 322, the application executed by processor 320 may instruct 330 interface circuit 312 to: perform a scan 332 of the available channels in the associated bands of frequencies; and establish a second connection 334 with radio node 110-1 based on scan results. For example, second connection 334 may be compatible with (LTE). In some embodiments, second connection 334 is in a shared-license-access band of frequencies that is shared by radio node 110-1 with another user that has higher priority than radio node 110-1. In this way, the communication technique may facilitate a handover.

Alternatively, when mapping information 328 indicates that there are no available channels in associated frequency bands at location 322, the application executed by processor 320 may instruct 330 interface circuit 312 to establish a third connection 336 with base station 130 (or radio node 110-1) in a licensed band of frequencies.

While FIG. 3 illustrates at least some of the operations in the communication technique being performed by the application executed by processor 320, in other embodiments some or all of the operations in the communication technique are performed by interface circuit 312.

In some embodiments, the communication technique facilitates dynamic and efficient identification of available shared network resources. For example, during a hand-in from a macrocell to a CBRS, network selection or cell selection (e.g., intra-frequency, or inter-frequency or inter-radio access technology) is typically governed by the policy provisioned in the user equipment (such as their cellular telephones). In general, these mobility policies are usually pre-provisioned in the user equipment. For radio access networks such as CBRSs, in which the spectrum allocation is dynamic, it is often difficult to pre-provision a mobility policy. Consequently, in order for the user equipment to select a channel in a CBRS, it may have to scan the entire spectrum (at least the first time). Then, the user equipment can remember the channel and the location (based on parameters such as the latitude, longitude and/or macrocell tower identity). This stored information can help optimize the subsequent selection process. However, because a spectrum allocation server can change the spectrum at a venue or in an environment, there is a risk that the stored information in the user equipment may not be valid.

Similarly, because the network coverage area in a CBRS is usually limited compared to the license band in a macrocell, when user equipment in connected mode with a CBRS network goes outside the CBRS network coverage area, the user equipment may select the macro network. For example, a handover from a CBRS to a macrocell may occur when the CBRS network quality goes below a predefined threshold. However, in the case of type I (non-neutral host network), the user equipment may purge the mobility-management context of the macro cellular-telephone network when it attached to the CBRS network. This may complicate attempts to reattach or handover to the macrocell.

In order to address these challenges, an over-the-top (OTT) application may be preinstalled on the user equipment (such as a cellular telephone. This OTT application may assist the network-selection process. This is shown in FIG. 4, which presents a block diagram illustrating electronic devices wirelessly communicating in accordance with an embodiment of the present disclosure. In particular, a network server (such as administrator computer 122) may maintain the location of the CBSDs in different environments 108 (indoor or outdoor) and the spectrum details that are used by the CBSDs, such as the available channels, the power levels, the E-UTRA absolute radio frequency channel number (EARFCN) for LTE, etc. This administrator computer may create a 'network data structure' with this mapping information from a variety of sources, such as: a spectrum allocation server, an eNode-B management system, measurements from user equipment (and, more generally, crowd sourcing), etc. Note that may communicate with other electronic devices via an S1 interface.

Moreover, the OTT application executing on electronic device 112 may act as a client and may connect to administrator computer 122 using any available Internet access (such as Wi-Fi or LTE). The OTT application may provide the current location of electronic device 112 (such as the latitude, the longitude, etc.). After receiving the location information, administrator computer 122 may look-up available CBRS network details within a geographical distance (such as 0.5, 1, 5 or 10 km) or electronic device 112. Note that the movement of electronic device 112 can be used to refine this mapping information.

Then, administrator computer 122 may provision into electronic device 112 a mobility policy and may provide the details of the available channels at the current location of electronic device 112 (i.e., the mapping information). Note that if there is more than one CBRS located in an environment, then administrator computer 122 may provide a list of EARFCNs as an ordered list (e.g., the list can be based on priority).

Next, the OTT application may provision the mobility policy on electronic device 112. In addition, the OTT application may instruct electronic device 112 to perform a scan based on the available channels, and then electronic device 112 may connect to a CBRS using one of the identified channels from the scan.

In some embodiments, in order to prevent a security compromise, the OTT application may communicate with administrator computer 122 securely (such as by using encrypted communication). Moreover, in some embodiments the OTT application may not have a user interface or may not require any user intervention or user action. Note that the OTT application may be used with both indoor and outdoor CBRS networks. Furthermore, a mobile-network operator may use the OTT application to switch electronic device 112 from a macrocell to a CBRS (hand-in) or from a CBRS to macrocell (hand-out).

We now describe embodiments of an electronic device, which may perform at least some of the operations in the communication technique. For example, the electronic device may include electronic device 112 in FIG. 1, or one of radio nodes 110 associated with a small cell or a transceiver associated with a wireless local area network. FIG. 5 presents a block diagram illustrating an electronic device 500 in accordance with some embodiments. This electronic device includes processing subsystem 510, memory subsystem 512, and networking subsystem 514. Processing subsystem 510 includes one or more devices configured to perform computational operations. For example, processing subsystem 510 can include one or more microprocessors, ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as nodes 508, e.g., a pad, which can be coupled to the one or more antennas 520. Thus, electronic device 500 may or may not include the one or more antennas 520. Note that nodes 508 may include one or more input nodes and/or one or more output nodes.) For example, networking subsystem 514 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, an eNode-B, a router, a switch, communication equipment, an access point, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program module 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an LTE communication protocol as an illustrative example, in other embodiments a wide variety of communication protocols and, more generally, wireless communication techniques may be used. For example, an electronic device may determine its location, and may provide it to a remote computer, such as a controller. In response, the electronic device may receive mapping information for available channels in associated bands of frequencies for one or more WLAN, which are proximate to the electronic device. (The available channels in the associated bands of frequencies may have been previously reported by the one or more WLAN to the remote computer.) Then, the electronic device may perform a scan of the available channels and may establish a connection with one of the WLANs. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) or in firmware in interface circuit 518. Alternatively or additionally, at least some of the operations in the communication technique may be implemented in a physical layer, such as hardware in interface circuit 518.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit that is configured to communicate with a radio node in a network, wherein the electronic device is configured to:
determine a location of the electronic device;
provide, addressed to a computer, the location;
receive, at the interface circuit, mapping information, wherein, when the mapping information indicates at least one available channel in a band of frequencies in the network at or proximate to the location of the electronic device, wherein the at least one available channel has not been dynamically allocated by a second computer in the band of frequencies, and wherein unavailable channels in the band of frequencies in the network arc have been dynamically allocated by the second computer and the unavailable channels are used for bidirectional communication;
perform, via the interface circuit and based at least in part on the mapping information, a scan of the at least one available channel in the band of frequencies, wherein the scan comprises less than the entire band of frequencies;

establish, via the interface circuit, a connection with the radio node based at least in part on results of the scan, wherein the connection is associated with a channel in the band of frequencies, wherein the band of frequencies comprises a shared-license-access band of frequencies and the shared-license-access band of frequencies comprises a Citizens Broadband Radio Service (CBRS), wherein the shared-license-access band of frequencies is shared by at least two of: an operator of the network; a second operator that licenses a portion of the band of frequencies; or a user that has higher priority than the operator in the band of frequencies, and wherein the performing and the establishing operations are performed by the electronic device during a hand in of the electronic device from a microcell in a cellular-telephone network to the network, and without pre-provisioning a policy for the network on the electronic device; and when the mapping information indicates that there are no available channels in the band of frequencies in the network at or proximate to the location, establish a second connection with the radio node in a licensed band of frequencies.

2. The electronic device of claim 1, wherein the unavailable channels in the band of frequencies have been allocated by the second computer to one or more of: another radio node in the network; the user; or the second operator.

3. The electronic device of claim 1, wherein the mapping information is associated with the computer.

4. The electronic device of claim 1, wherein the location is determined based on received location information that is associated with: a Global Positioning System, the cellular-telephone network, or a wireless local area network.

5. The electronic device of claim 1, wherein the computer is different from the second computer.

6. The electronic device of claim 1, wherein the second computer comprises a spectrum allocation server.

7. The electronic device of claim 1, wherein the connection is compatible with a cellular-telephone data communication protocol.

8. A non-transitory computer-readable storage medium for use in conjunction with an electronic device, the computer-readable storage medium storing program instructions that, when executed by the electronic device, cause the electronic device to perform operations comprising:

determining a location of the electronic device;

providing, addressed to a computer, the location;

receiving mapping information, wherein, when the mapping information indicates at least one available channel in a band of frequencies in a network at or proximate to the location of the electronic device, wherein the at least one available channel has not been dynamically allocated by a second computer in the band of frequencies, and wherein unavailable channels in the band of frequencies in the network have been dynamically allocated by the second computer and the unavailable channels are used for bidirectional communication;

performing, based at least in part on the mapping information, a scan of the at least one available channel in the band of frequencies, wherein the scan comprises less than the entire band of frequencies;

establishing a connection with the radio node based at least in part on results of the scan, wherein the connection is associated with a channel in the band of frequencies, wherein the band of frequencies comprises a shared-license-access band of frequencies and the shared-license-access band of frequencies comprises a Citizens Broadband Radio Service (CBRS), wherein the shared-license-access band of frequencies is shared by at least two of: an operator of the network; a second operator that licenses a portion of the band of frequencies; or a user that has higher priority than the operator in the band of frequencies, and wherein the performing and the establishing operations are performed by the electronic device during a hand in of the electronic device from a microcell in a cellular-telephone network to the network, and without pre-provisioning a policy for the network on the electronic device; and when the mapping information indicates that there are no available channels in the band of frequencies in the network at or proximate to the location, establishing a second connection with the radio node in a licensed band of frequencies.

9. The non-transitory computer-readable storage medium of claim 8, wherein the unavailable channels in the band of frequencies have been allocated by the second computer to one or more of: a radio node in the network; the user; or the second operator.

10. The non-transitory computer-readable storage medium of claim 8, wherein the mapping information is associated with the computer.

11. The non-transitory computer-readable storage medium of claim 8, wherein the location is determined based on received location information that is associated with: a Global Positioning System, the cellular-telephone network, or a wireless local area network.

12. The non-transitory computer-readable storage medium of claim 8, wherein the computer is different from the second computer.

13. The non-transitory computer-readable storage medium of claim 8, wherein the second computer comprises a spectrum allocation server.

14. The non-transitory computer-readable storage medium of claim 8, wherein the connection is compatible with a cellular-telephone data communication protocol.

15. A method for performing a scan, comprising:

by an electronic device:

determining a location of the electronic device;

providing, addressed to a computer, the location;

receiving mapping information, wherein, when the mapping information indicates at least one available channel in a band of frequencies in a network at or proximate to the location of the electronic device, wherein the at least one available channel has not been dynamically allocated by a second computer in the band of frequencies, and wherein unavailable channels in the band of frequencies in the network have been dynamically allocated by the second computer and the unavailable channels are used for bidirectional communication;

performing, based at least in part on the mapping information, the scan of the at least one available channel in the band of frequencies, wherein the scan comprises less than the entire band of frequencies;

establishing a connection with the radio node based at least in part on results of the scan, wherein the connection is associated with a channel in the band of frequencies, wherein the band of frequencies comprises a shared-license-access band of frequencies and the shared-license-access band of frequencies comprises a Citizens Broadband Radio Service (CBRS), wherein the shared-license-access band of frequencies is shared by at least two of: an operator of the network; a second operator that licenses a portion of the band of frequencies; or a user that has higher priority than the operator in the band of frequencies, and wherein the performing and the establishing operations are performed by the electronic device during a hand in of the electronic device from a microcell in a cellular-telephone network to the network, and without pre-provisioning a policy for the network on the electronic device; and when the mapping information indicates that there are no available channels in the band of frequencies in the network at or proximate to the location, establishing a second connection with the radio node in a licensed band of frequencies.

16. The method of claim 15, wherein the unavailable channels in the band of frequencies have been allocated by the second computer to one or more of: a radio node in the network; the user; or the second operator.

17. The method of claim 15, wherein the mapping information is associated with the computer.

18. The method of claim 15, wherein the location is determined based on received location information that is associated with: a Global Positioning System, the cellular-telephone network, or a wireless local area network.

19. The method of claim 15, wherein the computer is different from the second computer.

20. The method of claim 15, wherein the connection is compatible with a cellular-telephone data communication protocol.

* * * * *

UNITED STATES PATENT AND TRADEMARK OFFICE
CERTIFICATE OF CORRECTION

PATENT NO. : 11,589,404 B2
APPLICATION NO. : 16/877506
DATED : February 21, 2023
INVENTOR(S) : Kaliaperumal et al.

It is certified that error appears in the above-identified patent and that said Letters Patent is hereby corrected as shown below:

In the Claims

Column 14, Line 60, Claim 1: Please correct "network arc have" to read --network have--

Signed and Sealed this
Thirtieth Day of May, 2023

Katherine Kelly Vidal
*Director of the United States Patent and Trademark Office*